United States Patent Office 3,503,330
Patented Mar. 31, 1970

3,503,330

WIPE-ON LITHOGRAPHIC PLATES

Simon L. Chu, New York, N.Y., assignor to Polychrome Corporation, Yonkers, N.Y.

No Drawing. Filed Jan. 9, 1967, Ser. No. 607,879
Int. Cl. B41n *1/12*; G03c *1/52*
U.S. Cl. 101—455 7 Claims

ABSTRACT OF THE DISCLOSURE

Wipe-on lithographic printing plates can be improved vis-a-vis their resistance to deterioration during storage prior to use and during press runs by treating either an intermediate binder layer on an underlying base sheet or a metallic base sheet directly with a benzophenone compound, particularly those substituted on one or both of the phenyl moieties by one or more hydroxyl, sulfonic acid, nitro, alkyl and alkoxy groups.

This invention relates to a method for improving the shelf-life of planographic printing plates and to planographic printing plates having improved shelf-life, and more particularly to a method for improving the shelf-life of wipe-on lithographic printing plates and to wipe-on lithographic printing plates having improved shelf-life.

Wipe-on lithographic printing plates are commonly used by printer. Such plates are prepared by the printer or trade platemaker from sheets of aluminum, zinc or other suitable base materials that have been cleaned and either grained or coated by the manufacturer to make them receptive to a light-sensitive composition applied by the printer or platemaker. That composition, usually a light-sensitive diazo compound, for example, a condensation product of formaldehyde and para-amino-diphenylamine, in an aqueous medium, is wiped on to the plate and dried. The plate thus prepared then can be exposed, developed, de-sensitied and used according to the usual methods of the art.

Pre-sensitized plates are similar except that the manufacturer of the plate applies the light-sensitive diazo composition prior to selling the ready-to-be-exposed plate to the printer.

In either instance an intermediate coating to improve the bonding of the light-sensitive composition to the plate is desirable. Commonly used intermediate binders include silicates as disclosed in U.S. Patent No. 2,922,715 to Gumbinner, zirconium fluorides as disclosed in U.S. Patents No. 2,946,683 to Mellan and Gumbinner and No. 3,160,-506 to O'Connor and Chu, phosphate fluorides as disclosed in U.S. Patent No. 3,148,986 to Harper, and amine-formaldehyde resins as disclosed in U.S. Patent No. 3,161,518 to Deal. Such binder coatings usually are described as permanently hydrophilic in nature. The degree of permanency of their hydrophilic character, however, varies depending upon the type of coating and its exact manufacturing conditions. Thus, after prolonged storage, exposure to heat and exposure to moisture, plates, particularly aluminum plates, will tend to develop ink-receptive areas and eventually an overall sensitivity to grease which affect the quality of printing from the plates and impair their usefulness.

In the case of pre-sensitized plates, the light-sensitive diazo composition coated over the intermediate binder tends generally to be a reducing agent, and thus tends to protect against oxidation of the intermediate coating and to preserve its hydrophilic character. The diazo itself, however, is subject to decomposition by light, heat or prolonged storage as well as by the very function of protecting the intermediate. Wipe-on plates, of course, do not have the benefit initially of a diazo coating.

Attempts to overcome those disadvantageous features by protecting the hydrophilic interlayer have included the use of colloid materials such as polyvinyl alcohol, gum arabic, polyvinyl pyridine and certain polyhydroxy compounds. Those materials, however, if water-receptive, tend to dilute the aqueous diazo composition subsequently applied by either the manufacturer or the platemaker. On the other hand a water-unreceptive material, such as a wax or a resin, impairs the uniform wetting of the plate with the diazo coating. Adding alcohol to the diazo composition as a wetting agent tends to overcome that problem, but tends to impair the bond of diazo to the plate base.

It is accordingly an object of this invention to provide a method for improving the shelf-life of wipe-on lithographic printing plates. Another object of the invention is to provide an intermediate binder layer for wipe-on lithographic printing plates having improved shelf-life. A further object of the invention is to provide a method for increasing the resistance to deterioration of wipe-on lithographic printing plates during storage and during press runs. Still another object of the invention is to provide wipe-on lithographic printing plates having greater resistance to deterioration during storage and during press runs. These and other objects of the invention will be in part discussed and in part apparent from the following more detailed disclosure of the invention.

Broadly this invention encompasses the treating of wipe-on lithographic printing plates, and particularly the treating of intermediate bonding layers on wipe-on lithographic printing plates, with a benzophenone compound. The application of the benzophenone compound to the intermediate bonding layers, which are known and used in the art to improve the bonding of light-sensitive diazo compositions coated onto wipe-on plates, does not significantly interfere with or impair, if at all, the bonding effect of the intermediate layer. It does, however, improve the stability of the intermediate, thereby increasing its resistance to deterioration and improving its shelf-life. Moreover, the benzophenone compound can be applied directly to the untreated surface of a base sheet, for example, an aluminum base, and provide the same result of improving the resistance of the plate to deterioration during press runs.

Benzophenones that have been found to be suitable for treatment of the intermediate binder layers of wipe-on lithographic printing plates to improve their shelf-life include particularly benzophenones that are substituted on one or both of the phenyl moieties by one or more hydroxyl groups, sulfonic acid groups, nitro groups, alkyl groups, for example, of up to six carbon atoms, and alkoxy groups, for example of up to six carbon atoms. Such compounds include 2,4-dihydroxy-benzophenone; 2-hydroxy - 4-methoxy-benzophenone; 2-hydroxy - 4-methoxy-benzophenone-5-sulfonic acid; 2,2′-dihydroxy-4,4′-dimethoxy-benzophenone; 2,2′,4,4′-tetrahydroxy-benzephenone; and 2,2′-dihydroxy-4,4′-dimethoxy-benzophenone-5-sodium sulfonate. Benzophenones of this class are commercially available, for example, under the tradenames "Cyasorb" sold by American Cyanamid Company and "Uvinul" sold by General Aniline and Film Corporation.

Ordinarily these benzophenones are obtained in solid form and therefore can be dissolved or dispersed in a liquid medium, such as water or an organic solvent, for application to the base sheet of a plate that previously either has been merely cleaned or has been coated with an intermediate binder layer. During application care should be taken to minimize, or to avoid altogether, disturbing the coating of the binder layer. Alternatively, the benzophenone can be applied in the same medium along with the binder. The benzophenone in the medium selected can be applied to the plates in conventional ways known to the art.

There presently appears to be no critical limitation on the amount of the benzophenone to be applied although it seems to be desirable to use more than about 0.1% by weight calculated on the weight of the binder layer and not more than about 20%. A preferred range is from about 0.5% to about 5% of the benzophenone based on the amount of binder. For directly treating base materials such as aluminum not having an intermediate binder layer, approximately the same amount of benzophenone desirably is used, although it will be apparent that the percentages calculated on the weight of base material will be much smaller. It is sufficient in such instances to apply a very thin film, for example, approaching molecular thickness to the base surface.

The following examples are set forth to illustrate this invention more fully, and are not intended to limit the scope of the invention as disclosed hereinbefore.

EXAMPLE 1

A sheet of aluminum was grained by ball graining and brushing in a conventional manner, dipped in a 1% solution of potassium zirconium fluoride at 150° F. for 3 minutes, dipped in water at 150° F. for 3 minutes, and then rinsed and dried. The wipe-on plate thus prepared was then coated with a soltuion of 2-hydroxy-4-methoxy-benzophenone-5-sulfonic acid, about 0.8% strength in water. The plate was placed in an oven at 120° F. for 4 weeks and thereafter was coated with a diazo composition and used on a press. Good, clear copies were printed with the plate. Plates prepared without the benzophenone coating developed ink-receptive spots within a few days.

EXAMPLE 2

An aluminum lithographic printing plate was prepared and run on a press with good results following the procedures described in Example 1 but modified by the use, as the benzophenone compound, of 2,2',4,4'-tetrahydroxy-benzophenone.

EXAMPLE 3

Sheets of aluminum were cleaned and grained in a conventional manner. Thereafter aqueous solutions of 2-hydroxy-4-methoxy-benzophenone-5-sulfonic acid, varying in concentration from 4% to 14%, were applied onto the sheets. The treated sheets were aged generally as described in Example 1 and then coated with a diazo, exposed, developed and used to print. The copies were good, having clear backgrounds. Similar copies could not be obtained using aluminum plates not treated with the benzophenone.

Similar results could be obtained using sodium-2,2'-dihydroxy-4,4'-dimethoxy-5-sulfobenzophenone.

EXAMPLE 4

Good, clear printed copies could be obtained from an aluminum plate prepared by graining, applying an intermediate binder layer of a conventional silicate, coating that layer with a 1% aqueous solution of 2,4-dihydroxy-benzophenone, aging the coated plate and then applying a diazo to it as described in Example 1.

EXAMPLE 5

Good, clear printed copies could be obtained from an aluminum plate prepared by graining, applying an intermediate binder layer of a conventional phosphate fluoride, coating that layer with a 1% aqueous solution of 2,2'-dihydroxy-4,4'-dimethoxy-benzophenone, aging the coated plate and then applying a diazo to it as described in Example 1.

EXAMPLE 6

Good, clear printed copies could be obtained from an aluminum plate prepared by graining, applying an intermediate binder layer of a conventional amine-formaldehyde resin, coating that layer with a 1% aqueous solution of 2-hydroxy-4-methoxy-5-nitro-benzophenone, aging the coated plate and then applying a diazo to it as described in Example 1.

I claim:

1. A wipe-on lithographic printing plate comprising a base sheet, an intermediate binder layer on said base sheet consisting essentially of a silicate, a zirconium fluoride, a phosphate fluoride or an amine-formaldehyde resin, and having coated thereon a benzophenone compound.

2. A wipe-on lithographic printing plate as defined in claim 1 wherein said benzophenone compound is a water-soluble benzophenone.

3. A wipe-on lithographic printing plate as defined in claim 1 wherein said benzophenone compound is applied in an amount within the range of about 0.1% to about 20% by weight calculated on the weight of said intermediate binder layer.

4. A wipe-on lithographic printing plate as defined in claim 1 wherein said benzophenone compound is benzophenone substituted on the phenyl rings by up to three substituents selected from the group consisting of hydroxy, alkyl of up to six carbon atoms, alkoxy of up to six carbon atoms, sulfonic acid, inorganic sulfonates and nitro radicals.

5. A wipe-on lithographic printing plate as defined in claim 1 wherein said benzophenone compound is a member selected from the group consisting of 2,4-dihydroxy-benzophenone; 2-hydroxy-4-methoxy-benzophenone; 2-hydroxy-4-methoxy-benzophenone-5-sulfonic acid; 2-2'-dihydroxy-4-4'-dimethoxy-benzophenone; 2,2',4,4' - tetrahydroxy-benzophenone; and 2,2' - dihydroxy - 4,4' - dimethoxy-benzophenone-5-sodium sulfonate.

6. A wipe-on lithographic printing plate as defined in claim 1 wherein said binder layer is a zirconium fluoride.

7. A wipe-on lithographic printing plate as defined in claim 1 wherein said binder layer is a silicate.

References Cited

UNITED STATES PATENTS

| | | | |
|---|---|---|---|
| 2,682,559 | 6/1954 | Stanley et al. | 260—591 |
| 2,773,766 | 12/1956 | Sus et al. | 96—33 |
| 2,928,878 | 3/1960 | Holser et al. | 260—591 |
| 2,959,482 | 11/1960 | Neugebauer et al. | 96—33 |
| 2,976,259 | 3/1961 | Hardy et al. | 260—591 X |
| 3,008,995 | 11/1961 | Hoeschele et al. | 260—591 |
| 3,215,530 | 11/1965 | Riebel et al. | 260—591 X |
| 3,282,208 | 11/1966 | Ruderman | 101—456 |

ROBERT E. PULFREY, Primary Examiner
CLIFFORD D. CROWDER, Assistant Examiner

U.S. Cl. X.R.

96—33, 75, 86; 101—456, 457; 117—75